United States Patent [19]

Nicholson et al.

[11] 4,297,726
[45] Oct. 27, 1981

[54] TELEVISION RECEIVER CHASSIS ADAPTED TO BE COMPATIBLE WITH DIFFERENT TUNER AND CABINET CONFIGURATIONS

[75] Inventors: John E. Nicholson, Indianapolis; Paul C. Wilmarth, Noblesville, both of Ind.

[73] Assignee: RCA Corporation, New York, N.Y.

[21] Appl. No.: 114,872

[22] Filed: Feb. 7, 1980

[51] Int. Cl.³ .......................................... H04N 5/655
[52] U.S. Cl. ..................................... 358/254; 339/33; 455/349
[58] Field of Search ............... 358/254; 339/17 N, 33; 455/348, 349

[56] References Cited

U.S. PATENT DOCUMENTS 3,629,789 12/1971 Szeremy ................................ 339/33
4,127,876 11/1978 Schwartz ............................ 358/254

OTHER PUBLICATIONS

*AMP Catalog 77-451*, "AMP MTA Mass Termination Assemblies Printed Circuit Board Connectors", Revised 3-79, pp. 8, 9, 13-15.

*Primary Examiner*—Howard Britton
*Attorney, Agent, or Firm*—Paul J. Rasmussen; William H. Meagher; W. Brinton Yorks, Jr.

[57] ABSTRACT

A chassis for a television receiver is provided which is adapted to operate in cooperation with any one of a number of electrical subsystems which perform similar functions but have differing signal and power requirements, such as tuners, receiver controls, et cetera, and are located remote from the chassis within the receiver. Each subsystem is coupled to a connector by a cable. The connector includes a row of contacts located in symmetrically spaced holes in the connector. One of the holes is blocked and serves as a keying indication. Mounted on the chassis is a row of similarly symmetrically spaced terminals, with one terminal missing from the row. A connector can only be mated with the terminal row when the blocked hole in aligned with the missing terminal location.

8 Claims, 7 Drawing Figures

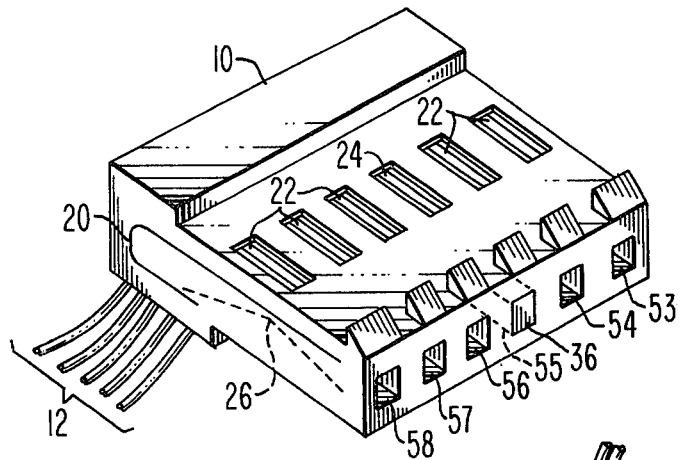
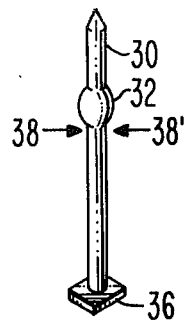
Fig. 3.
Fig. 4.
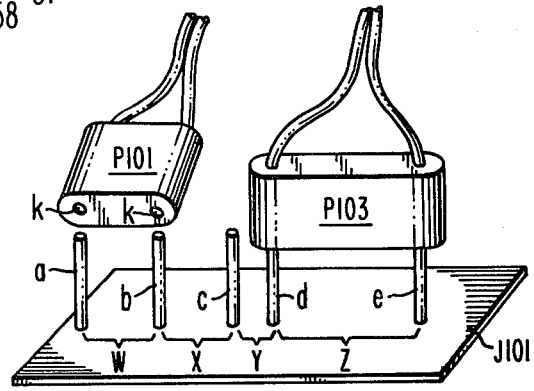
Fig. 6.
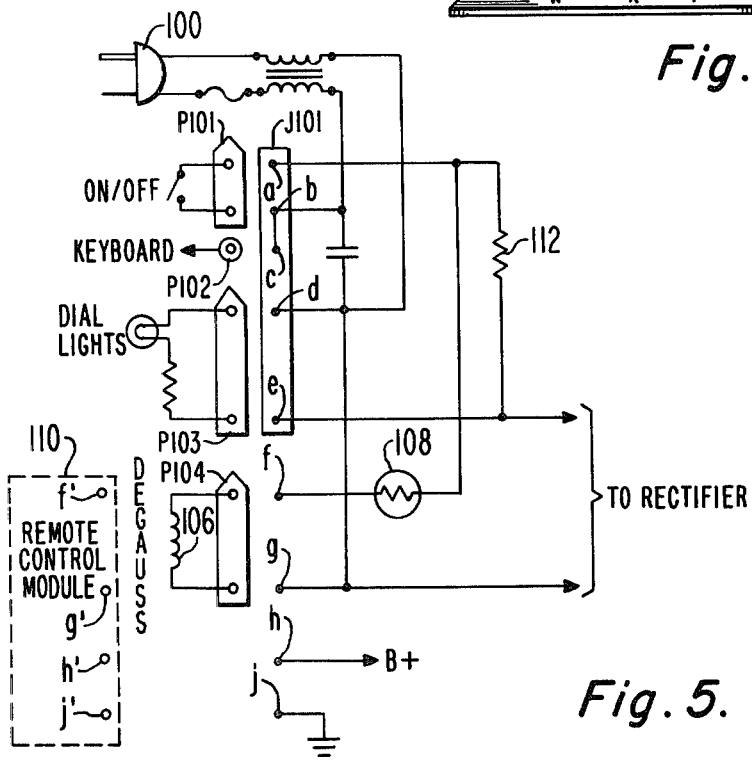
Fig. 5.

TELEVISION RECEIVER CHASSIS ADAPTED TO BE COMPATIBLE WITH DIFFERENT TUNER AND CABINET CONFIGURATIONS

This invention relates to television receiver chassis which are adapted to be compatible with different tuner and control combinations.

In the mass production of television receivers, it is desirable to produce a variety of receivers with different features which are attractive to a broad spectrum of potential customers. At the same time, it is economical to produce a minimum number of receiver subassemblies which may be conveniently combined to produce the variety of receivers desired. For instance, six different chassis could be combined with five distinct tuners and four sizes of picture tubes in various combinations, resulting in over 100 different possible television receiver configurations. Accordingly, it has been found to be desirable to design interconnections for the various receiver subassemblies which permit them to be interchangeable, and to be foolproof so that the interconnections will always be made properly during assembly.

In accordance with the principles of the present invention, a television receiver chassis is provided having connections which facilitate its use in combination with numerous tuners, picture tubes, and receiver controls, all of which may have differing signal and power requirements. A first row of terminals is provided on a chassis board. The terminals are symmetrically spaced, with the exception of one terminal location which is vacant so as to provide a keying indication. The first row of terminals provides the signal and power requirements for any of a number of different tuners or receiver controls, and is adapted to be mated with a plug from a tuner or receiver controls which have a number of plug holes spaced in accordance with the terminal spacings. One of the plug holes is blocked by a keying pin, so that the plug can only be mated with the terminals when the keying pin hole is aligned with the vacant terminal location. The plug can interconnect with some or all of the terminals, and different plugs having different keying pin hole locations will thus interconnect with different ones of the terminals. If desired, a cylindrical plug may be placed over one of the terminals to prevent the plug from being inserted backwards (i.e., left to right reversal).

In the drawing:

FIG. 3 is a perspective illustration of a plug suitable for mating with the terminals of FIG. 2;

FIG. 4 illustrates the keying pin used in the plug of FIG. 3;

FIG. 5 is a schematic representation of chassis terminals and matching plugs with asymmetrical spacing;

FIG. 6 is a perspective representation of some of the chassis terminals and matching plugs of FIG. 5.

Figure 1:
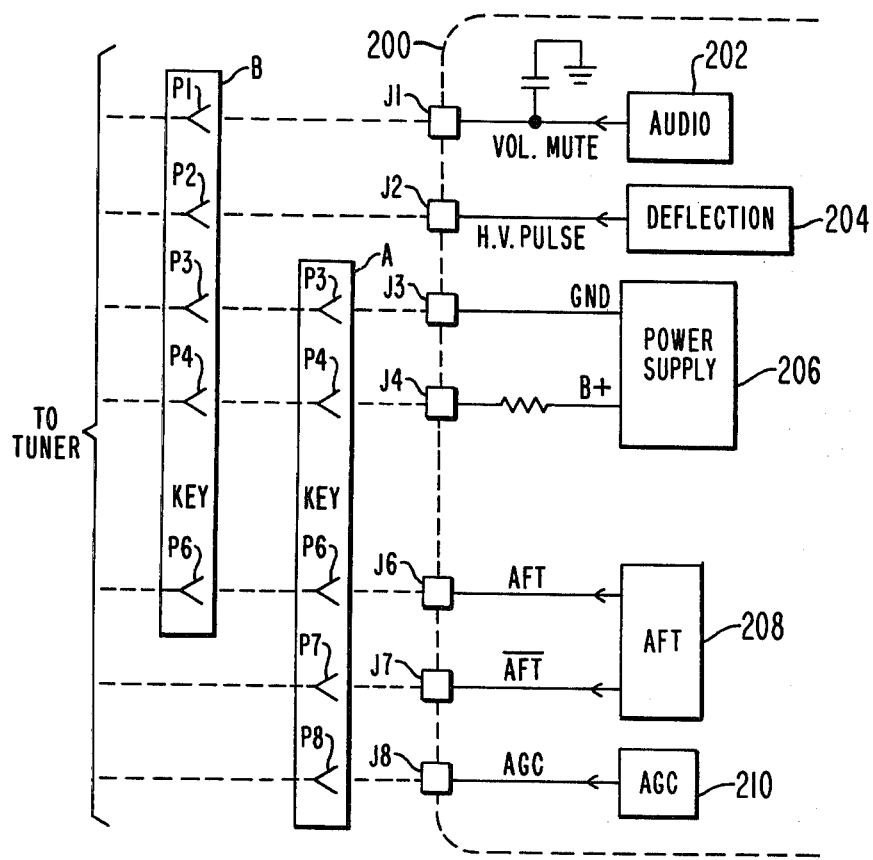
FIG. 1 is a schematic representation of chassis terminals adapted to be connected to plugs from different tuners in accordance with the principles of the present invention.

Referring to FIG. 1, chassis terminals J1 through J8 are shown connected to receive signals and power supply voltages from various areas of a television chassis 200. Terminal J1 receives a volume mute signal from the audio circuitry 202 of the chassis. Terminal J2 receives a high voltage pulse from the deflection circuitry 204. Terminals J3 and J4 receive ground and B+ voltages from the power supply 206. Terminals J6 and J7 are connected to receive opposite polarity AFT signals from the automatic fine tuning circuitry 208, and terminal J8 is coupled to receive an AGC voltage from the automatic gain control circuit 210. The signals and voltages are applied to the respective terminals in a carefully selected order, with the most commonly used signals and voltages applied to terminals at the center of the terminal column, and infrequently used signals and voltages applied to terminals located at the ends J1 and J8.

Terminals J1 through J8 are aligned in a symmetrically spaced row on the chassis board. It may be seen that there is no J5 terminal in the location between terminals J4 and J6. This is the keying terminal location. The absence of this terminal is used to allow a similarly keyed tuner plug to be mated only with the proper terminals on the chassis board.

Tuner plugs A and B are shown, each of which can be mated with the row of terminals J1–J8 to provide voltages and signals for the respective tuner. Plug A has contacts P3, P4, P6, P7 and P8 which connect to terminals J3, J4, J6, J7 and J8, respectively, when the key of the plug is aligned with the keying terminal location. Plug A can only be connected to the terminal in this alignment, since any other alignment will cause the plug key to align with a terminal, which will not permit the plug to be mated with the terminals. Plug A provides signals and voltages typically used by a mechanical type tuner, including B+ and ground voltages, both polarities of the AFT signal, and an AGC voltage.

Plug B can only be mated to the terminals J1–J8 when its contacts P1 through P6 are aligned with terminals J1–J6, respectively, since its key is located between contacts P4 and P6. Plug B provides signals and voltages commonly used by an electronic (frequency synthesizer) type tuner, including one AFT signal, a high voltage pulse, a volume mute signal, and B+ and ground.

Figure 2:
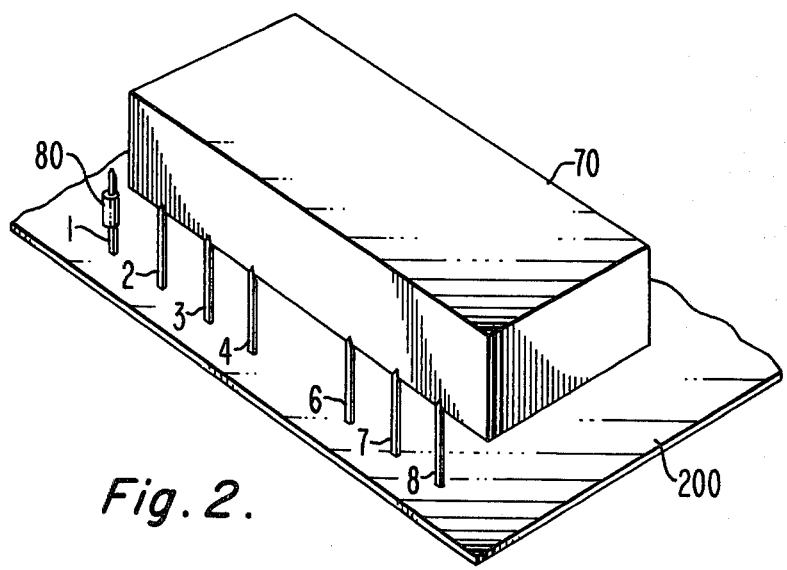
FIG. 2 is a perspective illustration of a portion of a chassis board including the terminals of FIG. 1.

Terminals J1 through J8 are shown in the perspective view of FIG. 2, in which terminal posts 1 through 8 correspond to terminals J1 through J8, respectively. The terminal posts are arranged in a symmetrical row near an I.F. shielding enclosure 70, which contains I.F. circuitry. This location is convenient, since the AFT and AGC signals are conventionally developed by the circuitry contained in this enclosure, and are subjected to less radio frequency interference when they need only be conducted a short distance to their respective terminal posts.

FIG. 3 shows a perspective view of a plug 10 which may be used to mate with terminal posts 1-8, and is arranged similar to plug A of FIG. 1. Plug 10 may be constructed of a phenolic or plastic material, and contains six parallel holes 53–58, each of which contains a U-shaped metallic spring contact clip 20. The spring contact clips are visible through slots 22, 24 in the upper surface of the plug. Five wires, shown at 12, connect to the ends of the spring contact clips located in holes 53, 54 and 56–58 at the back of the plug, which is not visible in this FIGURE. The other ends of the wires 12 are connected to a tuner. One leg of each U-shaped contact clip is bent as shown at 26, so that the clips will hug the terminal posts upon insertion of the posts into the plug.

The spring clip in hole 55 does not receive a wire 12, because this hole is the key position for plug 10. Referring jointly to FIGS. 3 and 4, FIG. 4 illustrates a keying pin 30 suitable for use with plug 10. The keying pin has a general nail-like shape with a square head 36. The keying pin also has a bulge 32 mid-way along its body. The keying pin 30 can be inserted in hole 55 so that its head 36 effectively closes the hole. This prevents insertion of a terminal post into the hole 55; consequently, the plug 10 can only be mated with the terminal post row of FIG. 2 when the plug is aligned with hole 55 located between posts 4 and 6, the keying terminal location. When the keying pin is inserted into plug 10, it is held in place by spring clip 20, since the pinched portion 26 of the spring clip grasps the keying pin just below bulge 32, as indicated by the location of arrows 38, 38' in FIG. 4.

When the terminal posts 1-8 of FIG. 2 are in proximity with the shielded enclosure 70 as illustrated, the enclosure provides an additional guide for mating the plug of FIG. 3 to the posts. When the plug is properly in place, the wires 12, which exit the plug from the bottom in FIG. 3, are directed away from the enclosure 70. If an attempt is made to reverse the plug, the hole 54 is aligned with terminal post 6, hole 53 is aligned with terminal post 7, hole 56 is aligned with terminal post 4, et cetera. In this alignment, the wires 12 will interfere with and contact the enclosure 70, which makes the plug insertion extremely awkward. The enclosure 70 thus makes obvious any attempt to insert the plug in a reversed orientation.

If it is desired to further prevent any attempt to insert the plug in a reverse orientation, a cylindrical plug 80 may be inserted over an unused terminal post to prevent its use, as shown in FIG. 2. The cylindrical plug 80 has a diameter greater than the opening of holes 53-58, which prevents the plug 10 from using the disabled terminal post. If terminals 1-8 were to be used with plug B of FIG. 1, for example, placing the cylindrical plug 80 over terminal post 7 (J7) or 8 (J8) would prevent plug B from being inserted in a reverse orientation. Likewise, placing the cylindrical plug 80 over terminal post 2 (J2) would prevent reverse connection of plug A (10 of FIG. 3) to the terminal post row.

Figure 7:
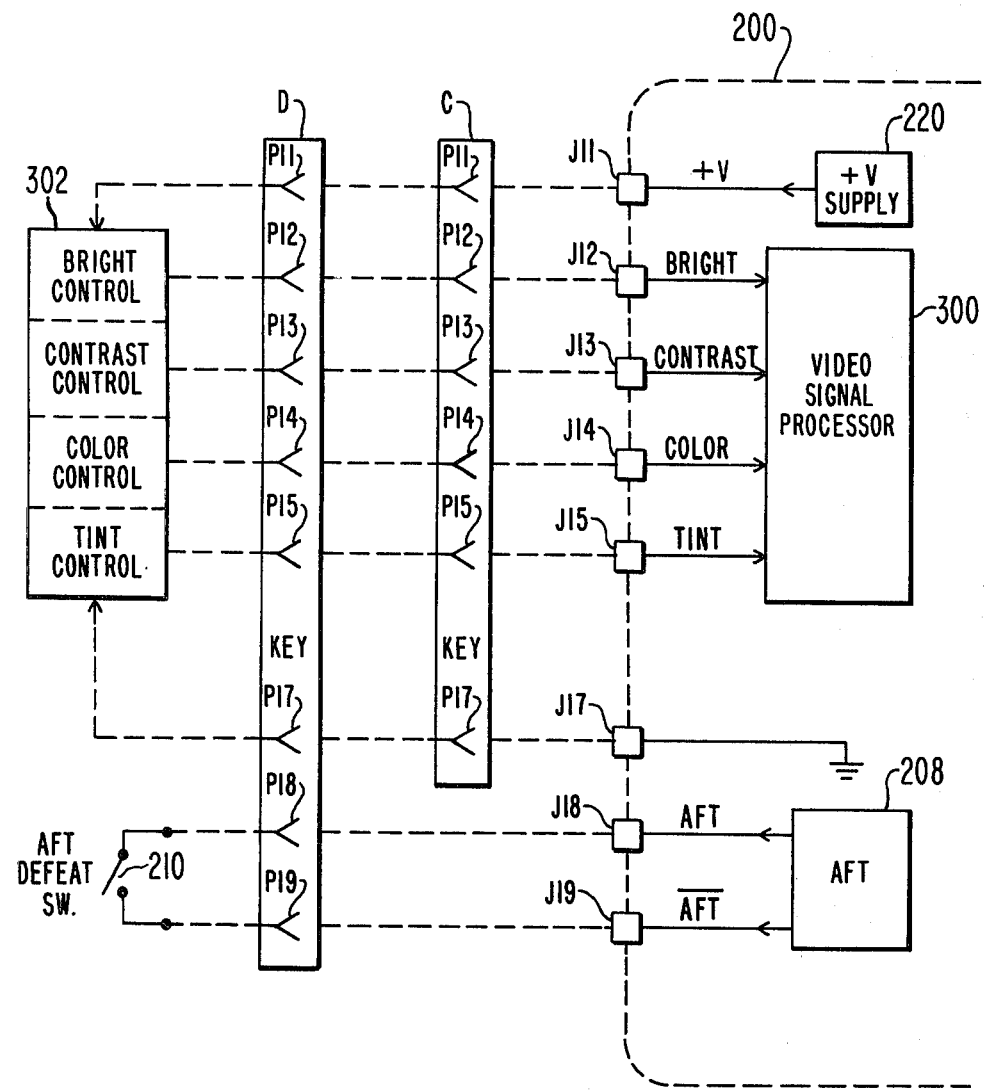
FIG. 7 is a schematic representation of chassis terminals adapted to be connected to plugs of different sizes from receiver controls in accordance with the principles of the present invention.

Plugs A and B are both six hole plugs. However, the plugs need not be of the same size, as illustrated in the arrangement of FIG. 7. Referring to that FIGURE, chassis board 200 is shown, having a row of symmetrically spaced terminals J11–J19. There is no terminal J16, as this location is the keying terminal location. Terminal J11 receives a +V voltage from a +V supply 220. Terminals J12 through J15 couple sources of control voltages from receiver controls. Terminal J12 is a brightness control voltage connection, terminal J13 is a contrast control voltage connection, terminal J14 is a color control voltage connection, and terminal J15 is a tint control voltage connection. These control voltages are supplied to a video signal processor 300. Terminal J17 is a ground connection, and terminals J18 and J19 receive opposite polarity AFT signals from AFT circuitry 208.

A plug C is shown having contacts P11–P17 and a key located between contacts P15 and P17. Contacts P11–P17 are connected to a receiver control module 302. When the plug is properly mated to the terminals with the key position located between terminals J15 and J17, the connections from contacts P11 and P17 provide power to the control module 302. The brightness, contrast, color and tint controls will then provide control voltages to the proper inputs of the video signal processor 300.

A plug D is shown, having similar contacts P11–P17 as plug C, plus additional contacts P18 and P19. The additional contacts P18 and P19 are connected to an AFT defeat switch 210, which can be closed to defeat AFT control during manual tuning of the receiver. Plug D may be advantageously used with a mechanical or varactor-type tuning system, while plug C may be used with an electronic tuning system in which AFT defeat is done electronically and hence does not use a manual defeat switch.

It may be seen that reversal of the plugs C and D with respect to their proper orientation with terminals J11–J19 is possible; however, it is not likely to occur. This is because reversal of the plugs will result in contacts P11 and P12 extending beyond the row of terminals J11–J19, which should be a sufficient indication of incorrect insertion. Moreover, if circuit components are located in close proximity to terminal J19 and in line with the terminal row, reverse connection of the plugs may be physically impossible.

In the plug-and-terminal arrangements discussed above, each row of terminals is capable of accepting a variety of different plugs, but only one plug can be used with each row of terminals at any one time. However, it is sometimes desirable to supply chassis signals and voltages to a row of terminals, and to simultaneously distribute these signals and voltages to different receiver subsystems by way of a number of small connectors. Since it is possible for different receivers to have different signal and voltage requirements depending upon, for instance, the features of a particular receiver, the number of connectors used with the terminal row may be expected to vary from model to model. Such a row of terminals will facilitate the connection of a common chassis to different subsystem combinations in various receivers.

Two rows of television chassis terminals, each of which is adapted to be used with one or more connectors simultaneously, and arranged to prevent the connection of connectors to wrong terminals, are illustrated in FIG. 5. A terminal board J101 contains a row of asymmetrically spaced terminals a through e. A.C. power is supplied to the terminals originating from the receiver's A.C. line plug 100. One A.C. line is coupled from the plug 100 to terminal d, a terminal g, and one input of the receiver's power supply rectifier. The other A.C. line is coupled to terminals b and c. Terminal a is coupled by way of a small resistor 112 to terminal e and to a second input of the power supply rectifier. Terminal a is also coupled to a terminal f by way of a P.T.C. thermistor 108. Terminals f and g, together with two terminals h and j, comprise a second asymmetrically spaced row of terminals. Terminal h is coupled to receiver a B+ voltage, and terminal j is coupled to ground.

In this configuration, terminals a and b are adapted to be connected to the receiver's on/off switch by way of a two-contact connector P101. Terminal c provides power for last channel memory when the set is off for a channel selection keyboard, if the receiver has one, by way of a single-contact connector P102. Terminals d and e provide power for the receiver's dial lights, if so equipped, by way of a connector P103. Terminals f and g provide momentary power for a degaussing coil 106 by way of another two-contact connector P104. Alternatively, terminals f, g, h and j can be plugged into a remote control degauss module 110 at respective contacts f', g', h' and j' with the remote control module being powered by voltage from terminals h and j. In this instance, connector P104 plugs into the remote control module 110 and receives momentary power through the thermistor 108 and circuit connections on the remote control module.

As mentioned above, the terminals a through j of the two rows are asymmetrically spaced. This asymmetrical spacing is shown in FIG. 6, in which the terminals a through e are shown mounted on the terminal board J101. The terminals have different spacings, as indicated at W, X, Y and Z. For instance, spacing W may be 0.4 inches, X may be 0.6 inches, Y may be 0.45 inches, and Z may be 0.8 inches. The two contacts of connector P101 are located in holes k, which are separated by a dimension W. Similarly, the contact holes of connector P103 are separated by the dimension Z. Thus, it may be seen that connector P101 can only be connected to terminals a and b, since these are the only two terminals with spacing that matches that of the contact holes k. Likewise, connector P103 can only be connected to matching speed terminals d and e.

In a similar manner, terminals f, g, h and j are asymmetrically spaced so that connector P104 can only be connected to terminals f and g. The spacings of terminals f, g, h, and j are also different from spacings W, X, Y and Z of the first asymmetrical row, to prevent the insertion of connectors in the wrong row.

It is possible to insert the correct two terminals in the proper connector, but in a reverse (i.e., upside down) orientation. However, in the arrangement of FIGS. 5 and 6, connector reversals are unimportant. This is because A.C. connections are being made to components for which polarity is irrelevant. It may be noticed that inserting terminals f, g, h, and j into the remote control module 110 in a reverse orientation (i.e., into contacts j', h', g' and f') is to be avoided, and may have catastrophic results. However, due to the asymmetrical spacing of these terminals and contacts, it is impossible to connect module 110 in any manner except the correct one.

What is claimed is:

1. A television receiver chassis containing television signal processing circuits including a plurality of different signal points, adapted for assembly with either a first or a second television receiver subsystem having different signal interface requirements with said chassis to form a television receiver, said first subsystem including a first connector coupled to the subsystem, said first connector including a first array of unblocked contact holes and one blocked contact hole, and said second subsystem including a second connector coupled to said second subsystem, said second connector including a second array of unblocked contact holes and one blocked contact hole; said television receiver chassis comprising:

an array of terminal locations, the number of said locations being equal to or greater than the number of contact holes in each connector, each of said locations being occupied by a terminal, with the exception of a blank terminal location which does not contain a terminal;

means for coupling said terminals to respective ones of said plurality of different signal points, wherein a first combination of some of said terminal locations including said blank terminal location is capable of engaging said first connector when said blank terminal location is aligned with said blocked hole of said first connector, and wherein a second different combination of said terminal locations including said blank terminal location is capable of engaging said second connector when said blank terminal location is aligned with said blocked hole of said second connector.

2. A television receiver chassis containing television signal processing circuits including a plurality of different signal points, and adapted for assembly with either a first or a second television receiver tuner which have different signal interface requirements with said chassis to form a television receiver, wherein each of said first and second tuners includes a connector coupled to the respective tuner, and said first tuner connector includes a first array of unblocked contact holes and one blocked contact hole, and said second tuner connector includes a second array of unblocked contact holes and one blocked contact hole; said television receiver chassis comprising:

an array of terminal post locations, the number of said locations being greater than the number of contact holes in either connector, each of said locations being occupied by a terminal post, with the exception of a blank terminal post location which does not contain a terminal post;

means for coupling said terminal posts to respective ones of said plurality of different signal points, wherein a first combination of some of said terminal post locations including said blank terminal post location is capable of engaging said first tuner connector when said blank terminal post location is aligned with said blocked hole of said first connector, and wherein a second different combination of said terminal post locations including said blank terminal post location is capable of engaging said second tuner connector when said blank terminal post location is aligned with said blocked hole of said second connector.

3. The arrangement of claims 1 or 2 wherein said blocked holes each contain a keying pin.

4. The arrangement of claims 1 or 2, wherein said blocked holes each contain no contact.

5. A television receiver chassis containing television signal processing circuits including a plurality of different signal points, adapted for assembly with either a first or a second combination of receiver controls to form a television receiver, said first combination of controls being coupled to a first connector including an array of a given number of unblocked contact holes and one blocked contact hole, and said second combination of controls being coupled to a second connector including an array of less than said given number of unblocked contact holes and one blocked contact hole; said television receiver chassis comprising:

an array of terminal post locations, the number of said locations being equal to said given number of contact holes, each of said locations being occupied by a terminal post, with the exception of a blank terminal post location which does not contain a terminal post;

means for coupling said terminal posts to respective ones of said plurality of different signal points, wherein said terminal posts are capable of engaging the unblocked contact holes of said first connector when said blank terminal post location is aligned with said blocked contact hole of said first connector, and wherein a combination of some of said terminal posts is capable of engaging the unblocked contact holes of said second connector when said blank terminal post location is aligned with said blocked contact hole of said second connector.

6. The arrangement of claim 1, wherein each of said arrays comprises a row, and
wherein signals utilized by both of said subsystems are applied to terminals located at intermediate locations in the row of terminals by said terminal coupling means, and a signal utilized by only one of said subsystems is applied to one of the terminals located at the end of said row of terminals by said terminal coupling means.

7. The arrangement of claims 2 or 5, wherein each of said arrays comprises a row, and
wherein signals utilized by both of said tuners are applied to terminal posts located intermediate the row of terminal posts by said terminal post coupling means, and a signal utilized by only one of said tuners is applied to one of said terminal posts located at the end of said row of terminal posts by said terminal post coupling means.

8. The arrangement of claim 1, further comprising means connected to one of said terminals having an outer dimension larger than the thickness of said terminal for preventing entry of said terminal into said contact holes,
whereby connection of said connectors in a reverse orientation with respect to said array is inhibited.

* * * * *